United States Patent [19]

Beebe

[11] Patent Number: 4,805,125

[45] Date of Patent: Feb. 14, 1989

[54] APPARATUS AND METHODS FOR IMPROVING UNIFORMITY MEASUREMENTS

[75] Inventor: James C. Beebe, Medina, Ohio

[73] Assignee: Eagle-Picher Industries, Inc., Cincinnati, Ohio

[21] Appl. No.: 62,153

[22] Filed: Jun. 12, 1987

[51] Int. Cl.$^4$ .................... G06F 17/02; G01M 17/02
[52] U.S. Cl. .................... 364/570; 364/506; 364/573; 73/146; 73/8; 73/462; 324/78 D
[58] Field of Search ............ 73/146, 8, 462; 364/576, 506, 508, 573; 377/17, 26; 324/78 D

[56] References Cited

U.S. PATENT DOCUMENTS

| | | | |
|---|---|---|---|
| 3,490,277 | 1/1970 | Sanders et al. | 364/576 |
| 3,719,813 | 3/1973 | Friedman et al. | 73/146 |
| 3,780,573 | 12/1973 | Reus | 73/146 |
| 4,018,087 | 4/1977 | Wenz | 364/576 X |
| 4,100,795 | 7/1978 | Pangtti | 73/146 |
| 4,327,580 | 5/1982 | Suzuki et al. | 73/146 |
| 4,702,103 | 10/1987 | Wenz | 73/146 |

Primary Examiner—Parshotam S. Lall
Assistant Examiner—Ellis B. Ramirez
Attorney, Agent, or Firm—Wood, Herron & Evans

[57] ABSTRACT

Apparatus and methods for use in measuring the uniformity of a body such as a tire, wheel or the like wherein a waveform related to the uniformity of the body is digitally sampled to acquire a series of data samples, each of which is correlated with a respective physical location on the body. According to a first aspect of the invention, a non-repetitive error component of the waveform is corrected for by sampling the same location on the body at two different times and determining the difference between the corresponding data samples. A part of the total difference is allocated to each of the data samples in the series according to a predetermined methematical function which at least approximately describes the non-repetitive component of the waveform. The part of the difference allocated to each sample is then subtracted from it to obtain a corrected series of data sample. According to a second aspect of the invention, the maximum, minimum and/or peak-to-peak values of the waveform are more accurately determined by relating selected extreme data samples and one or more data samples adjacent thereto to a polynomial function of at least second order. The function is then evaluated at the location where its first derivative equals zero to determine a more accurate and repeatable approximation of a maximum, minimum or peak-to-peak value of the waveform. According to yet another aspect of the present invention the first and second aspects above are practiced in conjunction with one another.

50 Claims, 2 Drawing Sheets

APPARATUS AND METHODS FOR IMPROVING UNIFORMITY MEASUREMENTS

FIELD OF THE INVENTION

The present invention relates to the art of measuring the uniformity of vehicle tires, wheels and the like. More particularly, the invention relates to an apparatus and methods for improving the accuracy and repeatability of such measurements.

BACKGROUND OF THE INVENTION

A tire uniformity inspection machine is employed to make certain measurements used to characterize the uniformity of construction of a tire. This is accomplished in part by measuring the nature of reaction forces in various directions generated by the tire as it rolls under load along a surface as well as by measuring runout at selected loci on the surface of the tire.

In a typical tire uniformity inspection machine, testing is fully automatic. Tires are fed by conveyor to a test station where each tire is mounted upon a chuck, inflated to a predetermined pressure and rotatably driven at a standard speed with its tread surface in forced contact with the circumferential surface of the loadwheel. The loadwheel is instrumented with load cells which measure forces due to the tire acting on the loadwheel in directions of interest. Each rotation of the tire is divided into a series of 128 nominally equally angularly spaced points by a rotary shaft encoder. At each point, the analog output of the load cells and runout sensing devices are sampled so that each data sample corresponds to a particular location on the tire. The data samples are then used to compute various quantities such as the maximum, minimum or peak-to-peak force variation and runout. As used herein, the term "peak-to-peak" force variation or runout refers to the largest overall force or dimensional swing occurring over one revolution regardless of whether the maximum and minimum points which determine that swing are adjacent one another.

SUMMARY OF THE INVENTION

I have discovered that one significant source of error in such measurements is that the analog waveform representing the instantaneous value of the parameter being measured may not be precisely repetitive from one revolution of the tire to the next. Instead, the waveform sometimes drifts over time according to some mathematical function. As viewed over a relatively few revolutions this function if often approximately linear, but may appear exponential when observed over a greater number of revolutions. Since the actual uniformity of the tire itself is not reasonably susceptible to such drift, it must be assumed that this phenomena represents a measurement error.

This error is believed to be due to a small but significant change in test conditions. One possibility is that thermal effects such as tire self-heating, rolling friction or external temperature changes induce changes in the inflation pressure of the tire or the size of the tire due to thermal expansion, or both. However, the ability of the present invention to effectively compensate for this type of measurement error does not depend on knowing why the error occurs.

Another type of error which the present invention addresses relates to the problem of accurately determining the maximum, minimum and peak-to-peak values of an analog waveform when using digital sampling techniques. It has commonly been the practice in tire uniformity testing to approximate the peak-to-peak value of a parameter as the difference between the largest and smallest data sample values. This technique gives rise to significant error.

Since there is no way of determining in advance where the local maxima and minima of the analog waveform will occur, there can be no guarantee that a data sample will be taken at precisely those points. Usually, the data samples will fall to either side of those local maxima and minima. Therefore, the computed peak-to-peak value will almost always be smaller than the actual value.

In theory, it is possible to overcome the latter type of error using Fourier analysis. According to the well known Nyquist theorem, for a waveform having A.C. components, the sampling rate must be at least twice the frequency of the highest frequency component present. If this condition is satisfied, the original waveform can be reconstructed using Fourier analysis and the maximum, minimum or peak-to-peak values accurately determined. However, this method is complex and hence does not make efficient use of the data processing capabilities of the test apparatus.

Another way to attempt to overcome this problem would be to resort to the oversampling; that is, sampling at a rate well in excess of the Nyquist rate to insure that a sample would be taken very close to, if not at, each local maximum and minimum thereby keeping the error small. This approach also places an undue burden on the system computer by requiring the taking and storing of many additional samples and determining which of them is the largest and smallest. Also, the maximum resolution of the shaft encoder limits the maximum sampling rate and hence the effectiveness of this method.

Accordingly, it is an object of the present invention to provide an apparatus and method for improving the accuracy and repeatability of uniformity measurements of bodies such as tires and the like by compensating for a non-repetitive component in what would otherwise be a repetitive continuous or sampled data field.

It is another object of the present invention to provide an apparatus and method for improving the accuracy and repeatability of uniformity measurements of bodies such as tires and the like by rapidly and accurately approximating the maximum, minimum and peak-to-peak values of a sampled waveform and which is computationally efficient and does not rely on oversampling.

It is yet a further objective of the present invention to provide an apparatus and method for improving the accuracy and repeatability of uniformity measurement of bodies such as tires and the like by both compensating for a non-repetitive component in a data field representing a parameter correlated with the uniformity of a tire or the like and by accurately approximating the maximum, minimum and peak-to-peak values of a sampled waveform which is computationally efficient and which does not rely on oversampling.

According to a first aspect of the present invention, there is provided an apparatus and method for improving the accuracy of uniformity measurements of tires and the like whereby an analog waveform representing a parameter of interest is sampled at a plurality, N, of points, each point being correlated with a given rotational position of the tire. One of the N, points, preferably the first of the series, is sampled twice and the difference, D between the first and second samplings is computed. This difference, D represents the total amount of non-repetitive component occurring over one revolution. A part of the total difference D is then calculated for each of the N samples in the series according to a predetermined mathematical function and that part apportioned to each sample is subtracted therefrom in order to eliminate the non-repetitive component from the data field. In its simplest form, the mathematical function is a linear function such that 1/Nth of D is subtracted from each data sample. If desired however, some other function such as an exponential may be used.

A second aspect of the present invention provides an apparatus and method for rapidly and accurately approximating maximum, minimum and peak-to-peak values of waveform based on sampled data. According to the invention, a local high or low point of the sampled data is selected. The approximate maximum or minimum of the waveform is determined by fitting a polynomial function between this point and the two sample points immediately adjacent it and solving for the magnitude of this function at its critical point. As used herein, the term "critical point" refers to the point at which the first derivative of a function equals zero. The order of the polynomial function is selected according to the desired accuracy, higher order functions providing better accuracy where demanded by a particular application. For peak-to-peak measurements, the maximum and minimum over a desired series of samples are approximated in the above manner and their difference computed. In testing tires, wheels or the like, the desired series of samples is selected to represent at least a full revolution of the physical body under test. Significant increases in accuracy and repeatability are achieved in a computationally efficient manner. For example, in one preferred embodiment described herein wherein the polynomial function is a quadratic, each approximate maximum or minimum is computed with only a single multiplication and a single division operation.

According to yet another aspect of the present invention, the first and second aspects of the invention are employed in conjunction with one another to provide best overall measurement accuracy and repeatability. When this is done, the method of the first aspect is performed first to eliminate the non-repetitive component from the data field. Subsequently, the second aspect of the invention is applied starting with the corrected rather than the as-sampled data field.

Additional objects and advantages and features of the various aspects of the present invention will become apparent to those skilled in the art upon review of the following detailed description of the invention taken in conjunction with the accompanying drawings, in which:

DETAILED DESCRIPTION OF THE INVENTION

Figure 1:
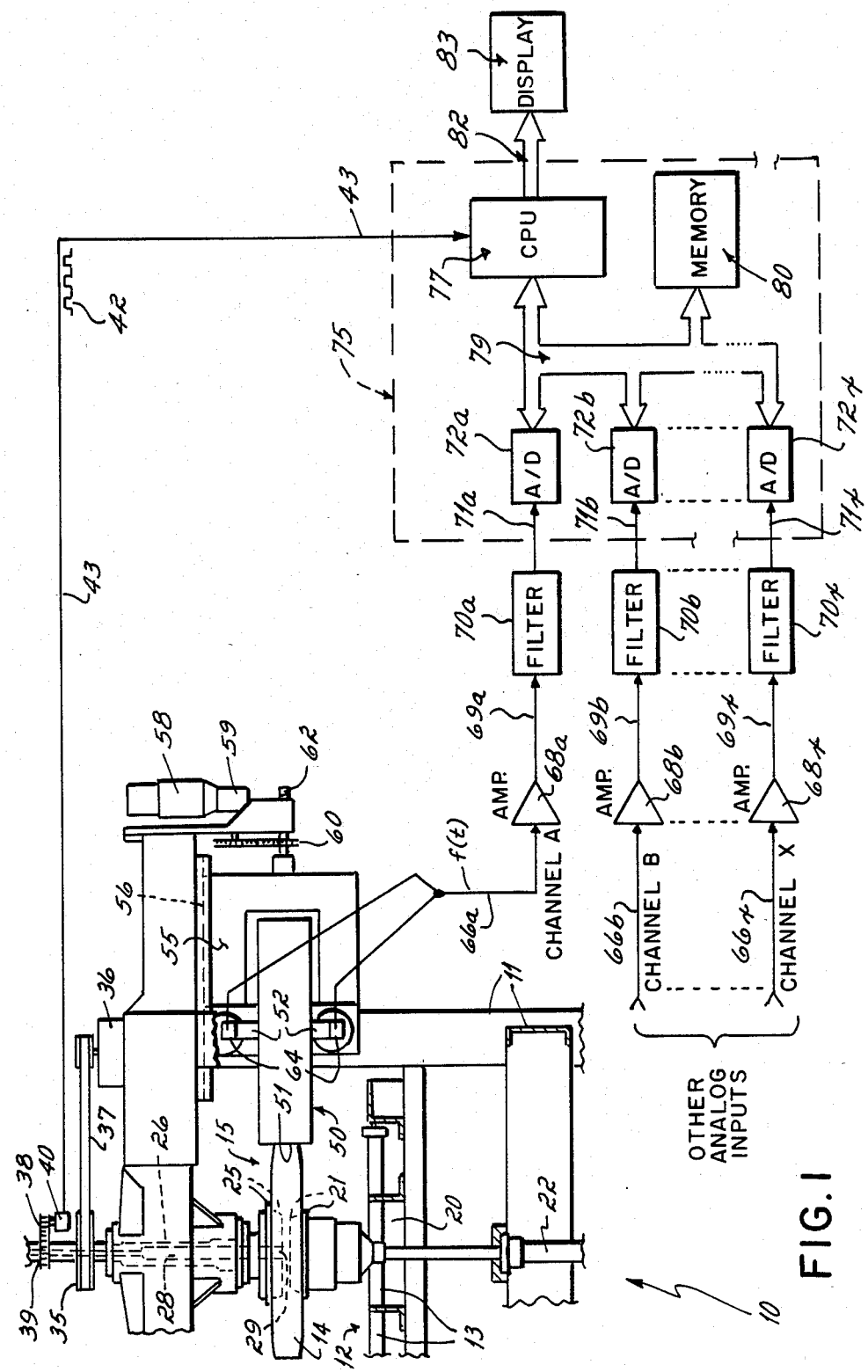
FIG. 1 is a partial schematic side elevational view of a tire uniformity inspection machine and a schematic block diagram illustrating a preferred embodiment of the present invention.

As shown in FIG. 1, a tire uniformity inspection machine 10 embodying the present invention includes a frame 11 which supports a conveyor 12 having a plurality of rollers 13 for delivering a tire 14 to be inspected to a test station 15. Conveyor 12 includes an opening 20 which is small enough to prevent a tire from falling through but large enough to pass a lower half chuck 21 which is rotatably mounted upon a vertically retractable lower tire spindle 22. An upper half chuck 25 is rotatably mounted by means of an upper tire spindle 26 to the upper portion of frame 11. Upper half chuck 25 is disposed opposite lower half chuck 21 so that upper and lower chucks 21 and 25 cooperate to function as a rim to support a tire 14 under test when lower half chuck 21 is in its extended position as shown. Upper tire spindle 26 includes an axial air passage 28 which communicates with an orifice 29 in upper half chuck 25 to permit inflation of tire 14 to a predetermined test pressure.

In order to rotate tire 14 at a desired test speed, upper tire spindle 26 is fitted with a drive pulley 35 connected to a drive motor 36 by way of a timing belt 37. A rotary shaft encoder 40 is connected by chain 38 and sprocket 39 or a belt and pulley to rotate synchronously with upper tire spindle 26 and hence, tire 14. Shaft encoder 40 produces a series of 128 nominally equally angularly spaced rotation pulses 42 on line 43 so that each rotation pulse 42 specifies a particular rotational position of tire 14 which can be identified according to its position with respect to position reference pulse 45.

A loadwheel 50 having a circumferential surface 51 is supported by loadwheel spindles 52 for free rotation about an axis parallel to that of the tire 14 under test. Loadwheel spindles 52 are in turn supported by a carriage 55 which is slidably secured to frame 11 by one or more ways 56 as to be moveable in the radial direction, toward and away from tire 14 so that a desired average radial load can be imposed upon tire 14 to establish a standard test condition prior to the taking of measurement data. As carriage 55 urges loadwheel 50 radially inward (to the left in FIG. 1) against tire 14, the radial load on tire 14 increases. Likewise, movement of carriage 55 radially outward (to the right in FIG. 1) reduces the radial force on tire 14. Carriage 55 is moved radially back and forth by a reversible D.C. motor 58 secured to frame 11. Motor 58 drives a gear box 59 whose output drives a chain and sprocket linkage 60 to rotate a ball screw rotation only female screw (not shown). A screw shaft 62 is fixed to carriage 55 is received within the female screw in order to translate carriage 55 in the radial direction as the female screw rotates. The preferred apparatus and method for establishing a desired average radial load on tire 14 is more fully described in my commonly assigned U.S. patent application Ser. 06/897,924 filed Aug. 19, 1986 which is expressly incorporated herein by reference in its entirety.

Loadwheel 50 is instrumented with a pair of strain gauge load cells 64, one of which is mounted upon each laodwheel spindle 52. Load cells 64 are wired in parallel with one another to generate an analog radial force signal, f(t) on line 66a which is correlated with the instantaneous radial force transmitted by the tire 14 under test to loadwheel 50.

As illustrated in FIG. 1, the radial force analog signal f(t) is input to Channel A which is one of a plurality of parallel analog input channels associated with tire uniformity inspection machine 10 and which includes an amplifier 68a, filter 70a and A/D converter 72a.

So that a number of parameters can be measured substantially simultaneously, machine 10 also generates a number of other analog inputs representing other parameters of interest. Each of these other inputs is processed by a similar one of a plurality of analog input channels arbitrarily designated B through X in FIG. 1. For example, in a tire uniformity inspection machine, in addition to radial force variation as indicated by signal f(t), lateral and tangential force variation are also sensed using two other pairs of load cells (not shown) mounted to loadwheel 50 in a manner similar to that of loadcells 64 except oriented to sense forces in the lateral and tangential directions. Also, 5 channels indicative of runout at various loci (two lateral and three radial) along the surface of tire 14 are employed. Therefore, while a total of 8 channels are generally used in a tire uniformity machine, a greater or fewer number of channels may be employed according to the demands of a particular application. The analog runout signals are derived by appropriate contact or non-contact distance measuring devices of the type well known in the art. Since CHANNEL A is typical of each of the other channels in respects material to the present invention, needless repetition is avoided by describing only that channel.

In CHANNEL A, analog force signal f(t) is carried on line 66a to an instrumentation amplifier 68a which provides isolation as well as any required, gain, scaling or offset adjustments in the manner well known in the art. The analog output of amplifier 68a is connected by way of a line 69a to a filter 70a. Filter 70a is preferably a lowpass, 3 pole, Butterworth active filter having its 3dB down point at 16 Hz. The passband of filter 70 is determined empirically in accordance with the nature of the analog input signal on line 66a to pass only those frequency components containing significant information. For example, with respect to radial force variation, it has been found that there is little significant information above 16 Hz. Therefore, the passband of CHANNEL A can be limited to frequencies below that value. The analog output of filter 70a is connected by way of a line 71 to an analog to digital converter (A/D), 72a which is preferably one of plurality of A/D converters contained in a single microcomputer 75. Preferably, microcomputer 75 is an Intel 88/40 single board, 16 bit microcomputer having 32 analog input channels, and includes in addition to a plurality of A/D converters 72, a 16 bit central processing unit (CPU) 77, a bidirectional data bus 79, a data memory 80. In addition CPU 77 also includes all other components necessary for proper operation such as a non-volatile program memory programmed in the manner to be described, a time base, input/output (I/O) devices, an address bus and the like (not shown). Also connected to an analog input port of CPU 77 by way of line 43 is the rotation pulse signal 42 emanating from rotary shaft encoder 40. Microcomputer 75 is also connected by way of a suitable output port 82 to a display device 83 such as a CRT.

In operation, carriage 55 which bears loadwheel 50, is initially retracted. A tire 14 to be inspected is carried by conveyor 12 to test station 15. Lower half chuck 21 is then extended, elevating tire 14 into test position so that tire 14 is clamped between lower half chuck 21 and rotating upper half chuck 25. Tire 14 is inflated to a desired test pressure by flowing air under pressure through axial air passage 28 and orifice 29. Drive motor 36, which is preferably an A.C. synchronous motor or A.C. servo motor, causes tire 14 to rotate at a nominally constant test speed of 60 R.P.M. Carriage 55 is then driven radially inward toward line 14 and the average radial load on the tire is established at a desired value in the manner described in the above referenced U.S. patent application Ser. No. 06/897,924.

As previously noted, for each revolution of tire 14, shaft encoder 40 generates 128 nominally equally angularly spaced rotation pulses 42. Since rotation of encoder 40 is synched to rotation of tire 14, the rising edge of each rotation pulse 42 represents a particular angular location on tire 14. CPU 77 and A/D 72a cooperate to digitally sample the filtered analog signal on line 71a at the rising edge of each rotation pulse 42 such that the value of the analog waveform at that point is converted to a digital data sample. A data field consisting of 130 of these data samples is stored by CPU 77 in a consecutive array in data memory 80.

The data field stored in memory 80 is continuously updated on a first in/first out (FIFO) basis with each incoming data sample such that data field represents at least the last complete revolution of tire 14. For explanatory purposes, those samples may be referred to as data samples 1 through 128. In addition to those 128, there is also stored within memory 80, that data sample immediately preceding the "first" sample. This sample will be referred to as the "0th" sample. It will be appreciated that the 0th sample represents the same angular position of tire 14 as does the 128th sample except that the 0th sample was taken during the immediately preceding revolution of tire 14. As will be more fully understood later, the first aspect of the present invention whereby non-repetitive components of the data field are effectively cancelled requires at least one point on the tire to be measured twice during different revolution. Hence, the need for the 0th sample.

The 0th sample is also needed for the second aspect of the present invention which, as will be seen, preferably requires that each data sample corresponding to one revolution have a predecessor sample and a successor sample. The 0th sample serves as a predecessor to the first sample. To provide a successor to the 128th sample CPU 77 also stores a 129th sample. As will be appreciated, this is in case the largest or smallest of the 128 samples corresponding to one complete revolution of tire 14 happens to be the first or 128th sample. In all then, where both aspects of the invention are to be practiced, as is preferred, the data field stored in data memory 80 consists of the most recent 130 samples taken, representing one full revolution of tire 14 plus two additional samples.

A software subroutine entitled READ_WAVEFORM, is found in the APPENDIX hereto. This subroutine illustrates in detail the instructions according to which CPU 77 is programmed in order to sample and store 130 data samples from the A/D converter 72a on the rising edge of the rotation pulses 42 emanating from encoder 40 and appearing at one of the analog inputs of CPU 77 by way of line 43.

Figure 2:
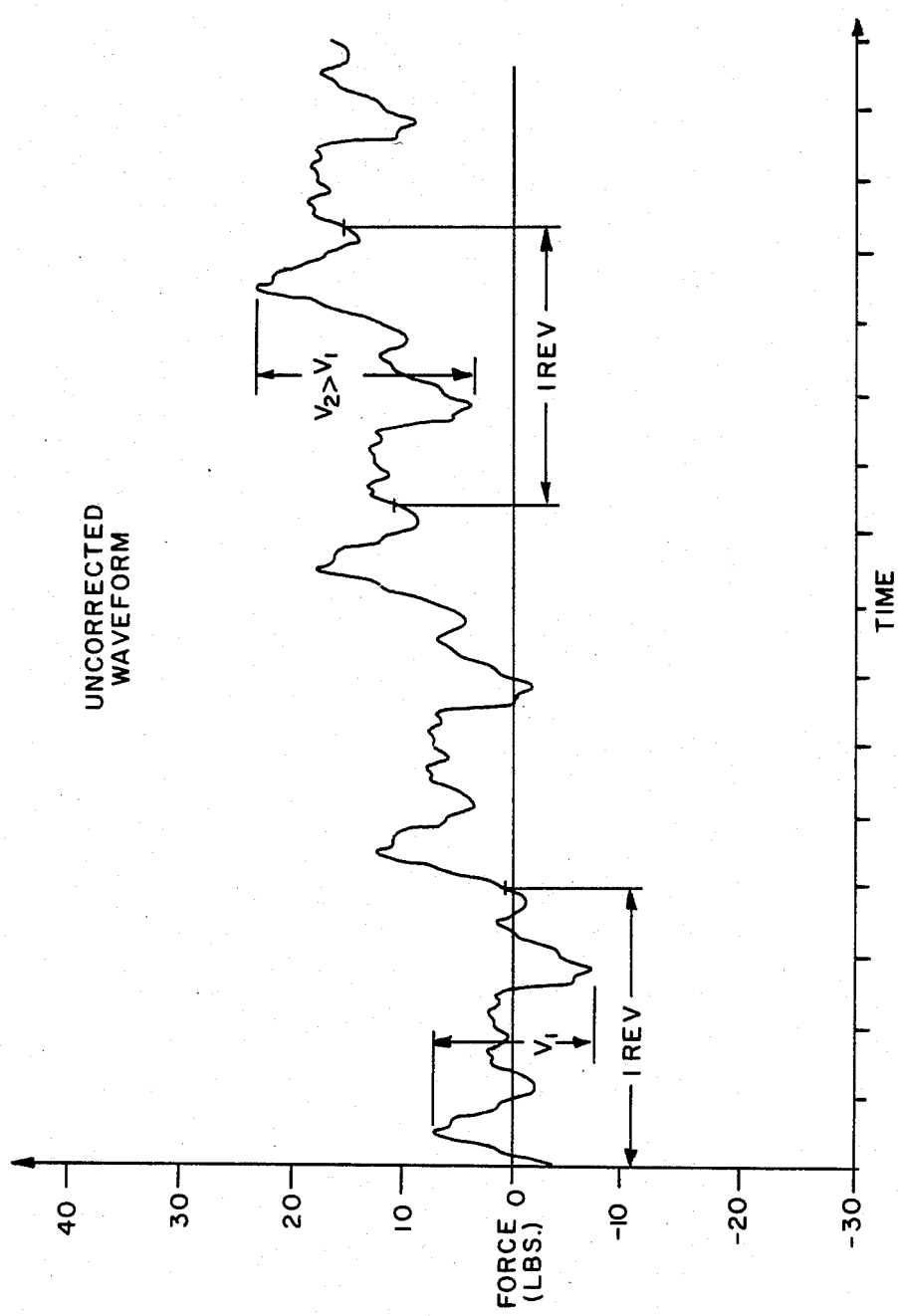
FIG. 2 illustrates a typical waveform to be processed according to the invention.

A first aspect of the present invention can be further understood with additional reference now to FIG. 2 wherein the waveform shown represents the analog output of loadcells 64 prior to data sampling. One would expect this waveform to repeat as a periodic function from one revolution of tire 14 to the next such that the measured value for a given rotational position of tire 14 would be almost identical over subsequent revolutions. Instead, I observed that the analog waveform and hence, the sampled data field, ascends over subsequent revolutions as shown in FIG. 2 according to a methematical function which has been observed to be approximately linear, at least over the duration of a test sequence. The peak-to-peak value over the first complete measured revolution is a value, V1 while over a subsequent full revolution measured from a different rotational position on tire 14, it is a somewhat greater value, V2. According to this aspect of the invention, after sampling the analog waveform in the manner previously described, CPU 77 determines the total amount of non-repetitive component or error occurring between subsequent revolutions of tire 14. Once determined, the total error per revolution is then apportioned among each of the stored data samples corresponding to that revolution in accordance with the observed mathematical function by which the waveform changes.

In the preferred embodiment described this is accomplished by subtracting sample #0 from sample #128 of the sampled data field. It will be recalled that both of these data samples correspond to the same rotational position of the tire 14 under test with respect to the surface 51 of loadwheel 50 except that they are measured one revolution of tire 14 apart. Therefore, the difference, D between these two samples represents the total error due to a non-repetitive component occurring per revolution.

Since, the analog waveform appearing on line 71a has been observed to climb linearly over the test sequence, the total error, D is linearly apportioned to each sample and subtracted therefrom to yield a corrected data field. That is, a quantity equal to N/128 times the total error, D where N corresponds to the number of the sample, is subtracted from each data point in the as-sampled data field to yield a corrected data field. In other words, the total amount D is subtracted from the 128th sample while 127/128th of D is subtracted from the 127th sample and so on for each sample so that 1/128th of D is subtracted from the first sample. The corrected data field generated in this way is then stored in memory 80 for further processing. The subroutine entitled CLOSE WAVEFORM, found in the APPENDIX illustrates the instructions according to which CPU 77 is programmed to carry out these steps.

While the invention has been described with reference to a linearly ascending function as has been observed in a particular measurement process, persons skilled in the art will appreciate that the invention is not so limited. This aspect of the invention can be applied to other measurement processes wherein a waveform, which is otherwise generally periodic, is observed to rise or decline at least approximately according to some mathematical function which need not be linear. For example, if the analog waveform had been observed to rise approximately according to some other mathematical function of time such as an exponential, then that function would be used to determine the fraction of the total error D to be subtracted from each sample to yield a corrected data field.

According to a second aspect of the present invention, the maximum, minimum and/or peak-to-peak values of a sampled data field such as the corrected data field derived as described above, are approximated to account for the fact that data samples will not ordinarily be taken at exactly the local maxima and minima of the analog waveform. In general, this is accomplished by fitting the data samples immediately preceding and succeeding a local maximum or minimum of the data field to a polynomial function of at least second order. The polynomial is solved for its highest critical point which may then be used as the approximate true critical point of the original waveform.

The order of the polynomial is selected to be at least two and as high as required to provided a desired degree of accuracy at the same time to reduce the amount of required computation and hence, increase the speed at which the method can be carried out, the order of the polynomial should be kept as low as possible. For tire testing of the type described earlier, I have found a polynomial function of the second order, commonly referred to as a quadratic to be suitable. Therefore, a quadratic will be used for illustration here.

A quadratic is of the general form:

$$Y = AX^2 + BX + C \qquad \text{EQUATION 1}$$

Preferably, the polynomial selected is of an even order so that the local maximum or minimum point and an identical number of data sample points preceding and succeeding it are used. It is noted that the total number of data samples taken preceding the first and succeeding the last of the series of samples representing one full revolution of tire 14 should be sufficient to insure that if the largest or smallest as-sampled data point happens to be the 1st or the 128th sample that there are a sufficient number of predecessor and successor samples respectively to carry out the method. As noted, for a second order polynomial function, one successor and predecessor sample are sufficient for a total of 130 data samples. For a fourth order polynomial for example, a total of 132 samples would be required; two immediately preceding and two immediately succeeding the first and last data samples respectively of the set of 128 samples representing one full revolution of tire 14.

Once a polynomial of appropriate order has been selected, variables representing the sampled local maximum or minimum data points and one or more points immediately preceding and succeeding that point and the respective times at which those samples were taken are substituted into an equation representing the general form of the polynomial to obtain a set of equations numbering one more than the order of the polynomial. Turning once more to the example using a quadratic, we define:

EQUATION 2    $R = Y|_{x=0}$    where, $x = 0$ is location of the largest (when approximating a maximum) or smallest (when approximating a minimum) data sample, $R$ of the field;

EQUATION 3    $P = Y|_{x=-1}$    where, $x = -1$ is the location of the data sample, $P$ immediately preceding $R$, and;

EQUATION 4    $S = Y|_{x=+1}$    where, $x = +1$ is the location of the data sample, $S$ immediately succeeding $R$.

This series of equations is used to solve for the coefficients of the general form of the polynomial (EQUATION 1) in terms of the substituted data samples as follows:

Substituting EQUATION 2 into EQUATION 1;

$$C = R \text{ (at } x = 0\text{)} \quad \text{EQUATION 5}$$

Substituting EQUATION 3 into EQUATION 1;

$$A - B + C = P \text{ (at } x = -1\text{)} \quad \text{EQUATION 6}$$

Substituting EQUATION 4 into EQUATION 1;
$$A + B + C = S \text{ (at } x = +1\text{)} \quad \text{EQUATION 7}$$

Subtracting EQUATION 7 from EQUATION 6;

$$-2B = P - S \quad \text{EQUATION 8}$$

Solving for B;

$$B = (S - P)/2 \quad \text{EQUATION 9}$$

Substituting EQUATION 9 into EQUATION 7 and solving for A;

$$A = (P - 2R + S)/2 \quad \text{EQUATION 10}$$

The critical point (or points) of the polynomial equation is (are) then determined by taking the first derivative and setting its value equal to zero. Taking the first derivative of EQUATION 1 and setting equal to zero gives:

$$2AX + B = 0 \quad \text{EQUATION 11}$$

Solving for X;

$$X = -B/2A \quad \text{EQUATION 12}$$

Substituting EQUATION 12 into EQUATION 1 and simplifying;

$$Y = A(-B/2A)^2 + B(-B/2A) + C \quad \text{EQUATION 13}$$

$$Y = B^2/4A - B^2/2A + C \quad \text{EQUATION 14}$$

$$Y = C - B^2/4A \quad \text{EQUATION 15}$$

An equation (or equations) for the approximated maximum or minimum value is then determined by evaluating the polynomial at the point (or points) where its derivative equals zero as follows:

Setting $Y = V$ (where V is the value of the quadratic at its critical point) and substituting EQUATIONS 5, 9 and 10 into EQUATION 13:

$$V = R - [(S - P)/2]^2/4[(P - 2R + S)/2] \quad \text{EQUATION 16}$$

$$V = R - [(S - P)^2/8(P - 2R + S)] \quad \text{EQUATION 17}$$

noting that:

$$(S - P)^2 = (P - S)^2 \quad \text{EQUATION 18}$$

Substituting EQUATION 18 into EQUATION 17;

$$V = R + [(P + S)^2/8(2R - P - S)] \quad \text{EQUATION 19}$$

Thus, EQUATION 19 expresses the value V of the quadratic at its critical point in terms of the largest or smallest data sample, R and the samples immediately preceding and succeeding it, P and S, respectively.

To more accurately determine the approximate maximum value of an analog waveform such as force signal 65 as measured over one revolution of tire 14, CPU 77 finds the largest data sample from the data field stored in memory 80. This value is substituted for R in Equation 18 and the immediately previous and subsequent data samples from memory 80 are substituted for P and S respectively. Equation 18 is then solved and value V is used as the approximate maximum value which may be displayed by way of display 83 or stored for subsequent computation of a peak-to-peak value in the manner to be described. In the case of a polynomial of greater than second order, a plurality of equations analogous to EQUATION 19 will be obtained. In that case, the appropriate data sample values are substituted into each such equation which are then solved. The solution whose magnitude is greatest is selected for use as the approximate maximum value. An approximate minimum value is determined in a similar manner except that the smallest data sample in the data field is substituted for R and its predecessor and successor samples substituted for P and S, respectively.

To more accurately determine an approximate peak-to-peak value, both an approximate minimum and an approximate maximum are determined in the above manner and the former subtracted from the latter. The computed maximum, minimum or peak-to-peak value may then be gated by CPU 77 to output port 82 and displayed by way of display 83 in humanly perceptible form and/or used to effect automatic grading or sorting of tires according to the measured value of one or more of those parameters by comparing the measured value to a predetermined acceptable limit.

The computer program set forth in the following APPENDIX illustrates software instructions according to which CPU 77 of FIG. 1 can be programmed to implement one preferred embodiment of the present invention as described herein. The program is written in the Intel 8086/8088 assembly language and, in light of the present disclosure, will be understandable to a person having ordinary skill in the art who is familiar with this programming language.

The main routine, entitled PERFORM_ANALYSIS, calls the various subroutines and initializes registers to the calling assumptions required by those subroutines. It also computes the approximate peak-to-peak value from the approximate maximum and minimum values obtained from the COMPUTE_MINMAX subroutine. As noted previously, the READ_WAVEFORM subroutine reads 130 data sample points from A/D converter 72 at the rising edges of encoder pulses 42 and stores them in memory 80.

The subroutine CLOSE_WAVEFORM operates according to the first aspect of the invention to substantially eliminate the non-repetitive error component from the as-sampled data field stored by the READ_WAVEFORM subroutine.

The FIND_MAX_LOC subroutine locates the address in the ai array containing the largest value data sample of the data field stored there whereas the FIND_MIN_LOC subroutine finds the smallest value data sample in the stored data field.

The COMPUTE_MINMAX subroutine operates according to the second aspect of the invention using a polynomial function to compute a more accurate approximate maximum or minimum value of the original waveform based on sampled data. While any polynomial function of at least second order can be used, the software illustrated uses a second order or quadratic function.

APPENDIX

```
;This routine calls the subroutines, and
; initializes registers to the calling assumptions
; required by the subroutines.
perform_analysis:
    mov     si, offset ai       ;Put address of
                                ; data buffer into
                                ; register SI
    call    read_waveform       ;Read the waveform into
                                ; data buffer
    mov     si, offset ai       ;Put address of data buffer
                                ; back into register SI
    call    close_waveform      ;Perform closure algorithm.
                                ;On return, the waveform has
                                ; been corrected for closure
                                ; error, and can be used for
                                ; harmonic analysis, or peak
                                ; analysis, as illustrated
                                ; below.
    mov     si, offset ai       ;Put address of data buffer
                                ; back into register SI
    call    find_minloc         ;Find address of min value
    call    compute_minmax      ;Perform algorithm to find
                                ; corrected value
    mov     min_value, ax       ;Store corrected min value
    call    find_maxloc         ;Find address of max value
    call    compute_minmax      ;Perform algorithm to find
                                ; corrected value
    mov     max_value, ax       ;Store corrected max value
    sub     ax, min_value       ;Compute peak_to_peak
    mov     peak_to_peak, ax    ;Store peak_to_peak value
                                ; into memory.
    ret                         ;Return to caller
; This subroutine will read 130 points from the a-d
; converter at the rising edge of the encoder.
; Specific details will vary with the hardware
; environment--this fragment will work with the
; built-in a-d converter on the Intel 88/40 board.
; One rev of data represents 128 points, but an extra
; leading point and an extra trailing point are taken
; to assure that each of the 128 points has a
; predecessor and a successor, as required by the
; algorithm.
; The subroutine expects the address of the data
; buffer in register SI.
read_waveform:
    mov     bl, 130             ;Take 128 points plus
                                ; 2 extras
lb1010:
    in      al, encoder         ;Get encoder status
    shr     al, 1               ;Test
    jc      lb1010              ;Wait until low
    in      al, encoder         ;Get encoder status
    shr     al, 1               ;Test
    jc      lb1020              ;Wait until high ...
                                ; (Detect leading edge)
    xor     ax, ax              ;Example--
                                ; Set up for channel 0
    out     a2d, al             ;Start conversion on channel
lb1030:
    in      al, ax              ;Read status from A/D
    shr     al, 1               ;Shift EOC bit into carry
    jc      lb1030              ;If not EOC, keep testing
    in      ax, a2d             ;Get result data
    mov     cl, 4
    sar     ax, cl              ;Shift right to align value
    xor     ah, 0f8h            ;Flip sign bits so that
                                ; zero counts is zero volts
    mov     [si], ax            ;Store to ai array
    inc     si
    inc     si                  ;Adjust to point to
                                ; next entry
    dec     bl
    jnz     lb1010              ;Loop until 130 points taken
    ret                         ;Return to caller
;This subroutine eliminates a non-repetitive component
; from the waveform taken in the previous step. It is
; assumed that on entry, register SI contains the ;
; address of a buffer of 130 2-byte integer values, ;
; representing one revolution of data (128 points) ;
; plus two extras.
;For speed, the assumption is made that the closure
; error will not exceed ±127 a-d counts.
;The routine uses fixed point binary fractions,
; with an eight bit fractional portion and an
; eight bit integer portion. The numbers
; contained in registers DX and DI are both used
; in this format.
close_waveform:
    mov     cx, 130             ;Process 130 points
    mov     di, [si][256]       ;Get point 128
    sub     di, [si]            ;Subtract point 0
                                ;Register DI now contains
                                ; the closure error
                                ; per revolution.
    shl     di, 1               ;Double and assume binary
                                ; fraction format
                                ; (representing a division
                                ; by 256).
                                ;Register DI now contains
                                ; the closure error
                                ; per 128th rev.
    mov     dx, 128             ;Initialize running closure
                                ; sum to '0.5' for
                                ; half rounding
lb1110:
    add     dx, di              ;Update running closure sum
    mov     al, dh              ;Get the integer portion of
                                ; the running closure
    cbw                         ;Sign extend to 16 bits
    sub     [si], ax            ;Correct the waveform data
    inc     si
    inc     si                  ;Point to next value
    loop    lb1110              ;Loop until
                                ; all data corrected
    ret                         ;Return to caller
;This subroutine will locate the address in
; the ai array containing the minimum value
; of the array.
;The subroutine expects the beginning address
; of the array in register SI, and returns the address
; containing the minimum value in register SI.
find_minloc:
    add     si, 2               ;Point to second entry
                                ; in array
    mov     di, si              ;Initialize location with
                                ; min
    mov     ax, [si]            ;Initialize value of min
    mov     cx, 127             ;Test 127 points after
                                ; initial point (one rev)
lb1310:
    inc     si
    inc     si                  ;Point to next entry
    cmp     [si], ax            ;Compare point with min
                                ; value
    jae     lb1320              ;Above (or equal)
                                ; min value ...
                                ;Go try next point
    mov     di, si              ;Update location of min
    mov     ax, [si]            ;Update value of min
lb1320:
    loop    lb1310              ;Loop until 128 points
                                ; tested
    mov     si, di              ;Copy location of min value
                                ; to SI
    ret                         ;Return to caller
;This subroutine will locate the address in
; the ai array containing the maximum value
; of the array.
;The subroutine expects the beginning address of
; the array in register SI, and returns the address
; containing the maximum value in register SI.
find_maxloc:
    add     si, 2               ;Point to second entry
                                ; in array
    mov     di, si              ;Initialize location with
                                ; max
```

APPENDIX

```
mov     ax, [si]            ;Initialize value of max
mov     cx, 127             ;Test 127 points after
                            ; initial point (one rev)
lb1310:
inc     si
inc     si                  ;Point to next entry
cmp     [si], ax            ;Compare point with max
                            ; value
jbe     lb1320              ;Below (or equal to)
                            ; max value . . .
                            ;Go try next point
mov     di, si              ;Update location of max
mov     ax, [si]            ;Update value of max lb1320:
loop    lb1310              ;Loop until 128 points
                            ; tested
mov     si, di              ;Copy location of max value
                            ; to SI
ret                         ;Return to caller
;This subroutine computes the extreme value
; (min or max) using a quadratic fit, as explained
; in the text. It expects the register SI to point to
; a 2-byte integer in memory containing the extreme
; sampled value, with the previous sample in the
; immediately preceding 2-byte location and the
; succeeding sample in the immediately following
; 2-byte location. The computed value is returned
; in register AX.
compute__minmax:
mov     di, [si]            ;di = 'R'
mov     cx, di
add     cx, cx              ;cx = '2R'
dec     si
dec     si
mov     ax, [si]            ;ax = 'P'
sub     cx, ax              ;cx = '2R-P'
add     si, 4
mov     bx, [si]            ;bx = 'S'
sub     cx, bx              ;cx = '2R-P-S'
sub     ax, bx              ;ax = 'P-S'
imul    ax                  ;dxax = '(P-S) 2'
idiv    cx                  ;ax = '(P-S) 2/(2R-P-S)'
sar     ax, 1
sar     ax, 1
sar     ax, 1               ;Divide by 8
adc     ax, di              ;Half adjust
                            ;AX =
                            ; 'R+(P-S) 2/(8*(2R-P-S))'
ret                         ;Return to caller
```

While the apparatus and methods described herein constitute preferred embodiments of the present invention, it is to be understood that the invention is not limited thereby and that in light of the present disclosure various alternative embodiments will be apparent to persons skilled in the art. Accordingly it is to be recognized that changes may be made without departing from the scope of the invention as particularly pointed out and distinctly claimed in the claims set forth below:

What is claimed is:

1. In a method for measuring the uniformity of a body, the steps of:
   (a) generating an analog waveform whose instantaneous value is related to the uniformity of said body;
   (b) sampling said waveform to acquire a series of data samples, each of said samples being correlated with a respective physical location on said body, said series of data samples including at least one data sample indicating the value of said waveform at a given one of said locations at one time and another data sample indicating the value of said waveform at said given one of said locations at another time;
   (c) determining the difference between said one data sample and said another data sample; and
   (d) calculating a part of said difference for each of said series of data samples according to a predetermined mathematical function, and subtracting from each data sample in said series that part of said difference calculated for said data sample to generate a corrected series of data samples.

2. The method of claim 1 wherein said predetermined mathematical function at least approximately describes a non-repetitive component of said waveform.

3. The method of claim 2 wherein said predetermined mathematical function is a linear function.

4. The method of claim 2 wherein said predetermined mathematical function is an exponential function.

5. The method of claim 1 wherein said body is a tire.

6. The method of claim 1 wherein said body is a wheel.

7. The method of claim 1 wherein said body is a tire mounted on a wheel.

8. The method of claim 1 further comprising the step of using said corrected series of data samples to determine the value of at least one parameter selected from the group consisting of a maximum value, a minimum value and a peak-to-peak value of said corrected series of data samples.

9. The method of claim 8 further comprising the step of displaying said value of said parameter in humanly perceptible form.

10. The method of claim 8 further comprising the step of grading said body according to said value of said parameter.

11. In an apparatus for measuring the uniformity of a body, means for generating a corrected series of data samples comprising:
    (a) sensing means for generating an analog waveform whose instantaneous value is related to the uniformity of said body;
    (b) sampling means connected to said sensing means for sampling said waveform to acquire a series of data samples each of said samples being correlated with a respective physical location on said body, said series of data samples including at least one data sample indicating the value of said waveform at a given one of said locations at one time and another data sample indicating the value of said waveform at said given one of said locations at another time;
    (c) memory means connected to said sampling means to store said series of data samples, and
    (d) computing means connected to said memory means, said computing means operating to determine the difference between said one data sample and said another data sample and to calculate a part of said difference for each of said series of data samples according to a predetermined mathematical function and to subtract from each data sample in said series that part of said difference calculated for said data sample to generate a corrected series of data samples.

12. The apparatus of claim 11 wherein said sampling means includes a rotary encoder to provide a signal according to which said data samples are correlated to respective physical locations on said body.

13. The apparatus of claim 11 further comprising filter means connected between said sensing means and said sampling means to limit the frequency content of said waveform prior to sampling.

14. The apparatus of claim 11 wherein said predetermined mathematical function at least approximately describes a non-repetitive component of said waveform.

15. The apparatus of claim 11 wherein said body is a tire.

16. The apparatus of claim 11 wherein said body is a wheel.

17. The apparatus of claim 11 wherein said body is a tire mounted on a wheel.

18. In a method of measuring the uniformity of a body, said method comprising the steps of:
   (a) generating an analog waveform whose instantaneous value is related to the uniformity of said body;
   (b) sampling said waveform to acquire a series of data samples;
   (c) selecting from said series a particular one of said data samples representing an extreme value as well as at least one data sample preceding said particular data sample and at least one data sample succeeding said particular data sample;
   (d) relating said particular data sample and each of said preceding and succeeding data samples to a polynomial equation of at least second order, and
   (e) determining an approximate extreme value by evaluating said polynomial equation at the location where its first derivative equals zero.

19. The method of claim 18 wherein said polynomial equation is a quadratic.

20. The method of claim 18 wherein said body is a tire.

21. The method of claim 18 wherein said extreme value represents the largest data sample of said series of data samples.

22. The method of claim 18 wherein said extreme value represents the smallest data sample of said series of data samples.

23. In an apparatus for measuring the uniformity of a body, means for determining an approximate extreme value, comprising:
   (a) sensing means for generating an analog waveform whose instantaneous value is related to the uniformity of said body;
   (b) sampling means connected to said sensing means for sampling said waveform to acquire a series of data samples;
   (c) memory means connected to said sampling means for storing said series of data samples; and
   (d) computing means connected to said memory means, for selecting from said series a particular one of said data samples representing an extreme value as well as at least one data sample preceding said particular data sample and at least one data sample succeeding said particular data sample, said computer means also operating to relate said particular data sample and each of said preceding and succeeding data samples to a polynomial equation of at least second order, and to determine an approximate extreme value by evaluating said polynomial equation at the location where its first derivative equals zero.

24. The apparatus of claim 23 wherein said polynomial equation is a quadratic.

25. The apparatus of claim 23 further comprising display means to display said approximate extreme value in humanly perceptible form.

26. The apparatus of claim 23 wherein said body is a tire.

27. The apparatus of claim 23 wherein said computing means further operates to determine a peak-to-peak value of said series of data samples based on said approximate extreme value.

28. In a method for measuring the uniformity of a body, the steps of:
   (a) generating an analog waveform whose instantaneous value is related to the uniformity of said body;
   (b) sampling said waveform to acquire a series of data samples, each of said samples being correlated with a respective physical location on said body, said series of data samples including at least one data sample indicating the value of said waveform at a given one of said locations at one time and another data sample indicating the value of said waveform at said given one of said locations at another time;
   (c) determining the difference between said one data sample and said another data sample;
   (d) calculating a part of said difference for each of said series of data samples according to a predetermined mathematical function, and subtracting from each data sample in said series that part of said difference calculated for said data sample to generate a corrected series of data samples;
   (e) selecting from said corrected series of data samples a particular one of said corrected data samples representing an extreme value as well as at least one corrected data sample preceding said particular corrected data sample and at least one corrected data sample succeeding said particular data sample;
   (f) relating said particular corrected data sample and each of said preceding and succeeding corrected data samples to a polynomial equation of at least second order, and
   (g) determining an approximate extreme value by evaluating said polynomial equation at the location where its first derivative equals zero.

29. The method of claim 28 wherein said polynomial equation is a quadratic.

30. The method of claim 28 wherein said body is a tire.

31. The method of claim 28 further comprising the step of determining a peak-to-peak value of said corrected series of data samples based on said approximate extreme value.

32. The method of claim 31 further comprising the step of grading said body according to said peak-to-peak value.

33. An improved apparatus for measuring the uniformity of a body, said apparatus comprising:
   (a) sensing means for generating an analog waveform whose instantaneous value is related to the uniformity of said body;
   (b) sampling means connected to said sensing means for sampling said waveform to acquire a series of data samples each of said samples being correlated with a respective physical location on said body, said series of data samples including at least one data sample indicating the value of said waveform at a given one of said locations at one time and another data sample indicating the value of said waveform at said given one of said locations at another time;
   (c) memory means connected to said sampling means to store said series of data samples, and
   (d) computing means connected to said memory means, said computing means operating to determine the difference between said one data sample and said another data sample and to calculate a part of said difference for each of said series of data samples according to a predetermined mathematical function and to subtract from each data sample in said series that fraction of said difference calculated for said data sample to generate a corrected series of data samples and to select from said corrected series of data samples a particular one of said corrected data samples representing an extreme value as well as at least one corrected data sample preceding said particular corrected data sample and at least one corrected data sample succeeding said particular corrected data sample, said computer means also operating to relate said particular corrected data sample and each of said preceding and succeeding corrected data samples to a polynomial equation of at least second order, and to determine an approximate extreme value by evaluating said polynomial equation at the location where its first derivative equals zero.

34. The apparatus of claim 33 wherein said computing means further operates to determine a peak-to-peak value of said corrected series of data samples based on said approximate extreme value.

35. A method of measuring the uniformity of a body, said method comprising the steps of:
(a) generating an analog waveform whose instantaneous value is related to the uniformity of said body;
(b) sampling said waveform to acquire a series of data samples;
(c) selecting from said series of samples, the largest sample therein, $R_{MAX}$, and
(d) determining an approximate maximum value, $V_{MAX}$, of said waveform according to the expression, $$V_{MAX} = R_{MAX} + [(P_{MAX}-S_{MAX})^2/8(2R_{MAX}-P_{MAX}-S_{MAX})]$$

wherein, $P_{MAX}$ is that sample in said series which immediately precedes $R_{MAX}$, and $S_{MAX}$ is that sample in said series which immediately succeeds $R_{MAX}$.

36. The method of claim 35 further comprising the step of displaying said approximate maximum value, $V_{MAX}$, in humanly perceptible form.

37. A method of measuring the uniformity of a body, said method comprising the steps of:
(a) generating an analog waveform whose instantaneous value is related to the uniformity of said body;
(b) sampling said waveform to acquire a series of data samples;
(c) selecting from said series of samples, the smallest sample therein, $R_{MIN}$, and
(d) determining an approximate minimum value, $V_{MIN}$, of said waveform according to the expression, $$V_{MIN} = R_{MIN} + [(P_{MIN}-S_{MIN})^2/ 8(2R_{MIN}-P_{MIN}-S_{MIN})]$$

wherein, $P_{MIN}$ is the sample in said series which immediately precedes $R_{MIN}$, and $S_{MIN}$ is the sample in said series which immediately succeeds $R_{MIN}$.

38. The method of claim 37, further comprising the step of: displaying said approximate minimum value, $V_{MIN}$, in humanly perceptible form.

39. A method of measuring the uniformity of a body, said method comprising the steps of:
(a) generating an analog waveform whose instantaneous value is related to the uniformity of said body;
(b) sampling the waveform to acquire a series of data samples;
(c) selecting from said series of samples, the largest sample therein, $R_{MAX}$, and the smallest sample therein, $R_{MIN}$;
(d) determining an approximate maximum value, $V_{MAX}$, of the waveform according to the expression, $$V_{MAX} = R_{MAX}$$

wherein, $P_{MAX}$ is the value of that sample in said series which immediately precedes $R_{MAX}$, and $S_{MAX}$ is the value of that sample in said series which immediately succeeds $R_{MAX}$;
(e) determining an approximate minimum value, $V_{MIN}$, of the waveform according to the expression, $$V_{MIN} = R_{MIN} + [(P_{MIN}-S_{MIN})^2/8(2R_{MIN}-P_{MIN}-S_{MIN})]$$

wherein, $P_{MIN}$ is the value of that sample in said series which immediately precedes $R_{MIN}$, and $S_{MIN}$ is the value of that magnitude sample in said series which immediately succeeds $R_{MIN}$, and
(f) determining an approximate peak-to-peak value, $V_{PK-PK}$, of the waveform according to the difference between $V_{MAX}$ and $V_{MIN}$.

40. The method of claim 39 further comprising the step of displaying said approximate peak-to-peak value, $V_{PK-PK}$, in humanly perceptible form.

41. The method of claim 39 wherein said waveform is correlated with the force variation of a tire.

42. The method of claim 39 wherein said series of samples represents at least one revolution of said tire.

43. The method of claim 39 wherein said waveform is correlated with the runout measured along a locus of points on said body.

44. The method of claim 39 wherein said physical body is a tire.

45. The method of claim 39 wherein said physical body is a wheel.

46. The method of claim 39 wherein said physical body is a tire mounted on a wheel.

47. An apparatus for measuring the uniformity of a body, said apparatus comprising:
(a) sensing means for generating an analog waveform whose instantaneous value is related to the uniformity of said body;
(b) sampling means connected to said sensing means for sampling said waveform to acquire a series of data samples;
(c) memory means connected to said sampling means for storing said series of samples; and
(d) computing means, operably connected to said memory means, said computing means being programmed for selecting from said series of samples, the largest sample therein, $R_{MAX}$, and for determining an approximate maximum value, $V_{MAX}$, of the waveform according to the expression, $$V_{MAX} = R_{MAX} + [(P_{MAX} - S_{MAX})^2 / 8(2R_{MAX} - P_{MAX} - S_{MAX})]$$

wherein, $P_{MAX}$ is that sample in said series which immediately precedes $R_{MAX}$, and $S_{MAX}$ is that sample in said series which immediately succeeds $R_{MAX}$.

48. The apparatus of claim 47 further comprising: display means operably connected to said memory means for displaying said approximate maximum value, $V_{MAX}$, in humanly perceptible form.

49. An apparatus for approximating the peak-to-peak value, $V_{PK-PK}$, of the magnitude of a waveform, said apparatus comprising:
 (a) sampling means, receiving the waveform, for sampling said waveform at intervals of time to acquire a successive series of samples;
 (b) first memory means operably connected to said sampling means, for storing said series of samples;
 (c) computing means operably connected to said first memory means, for,
  (i) selecting from said series of samples, the largest sample, $R_{MAX}$ and the smallest sample, $R_{MIN}$,
  (ii) determining an approximate maximum value, $V_{MAX}$, of the waveform according to the expression, $$V_{MAX} = R_{MAX} + [(P_{MAX} - S_{MAX})^2 / 8(2R_{MAX} - P_{MAX} - S_{MAX})]$$

wherein $P_{MAX}$ is the sample in said series which immediately precedes $R_{MAX}$, and $S_{MAX}$ is the sample in said series which immediately succeeds $R_{MAX}$,
  (iii) determining an approximate minimum value of the waveform according to the expression, $$V_{MIN} = R_{MIN} + [(P_{MIN} - S_{MIN})^2 / 8(2R_{MIN} - P_{MIN} - S_{MIN})]$$

wherein $P_{MIN}$ is the sample in said series which immediately precedes $R_{MIN}$ and $S_{MIN}$ is the sample in said series which immediately succeeds $R_{MIN}$, and
  (iv) determining an approximate peak-to-peak value, $V_{PK-PK}$ of the waveform according to the difference between $V_{MAX}$ and $V_{MIN}$.

50. The apparatus of claim 49, further comprising: display means operably connected to said second memory means, for displaying said approximate peak-to-peak value, $V_{PK-PK}$, in humanly perceptible form.

* * * * *

UNITED STATES PATENT AND TRADEMARK OFFICE
CERTIFICATE OF CORRECTION

PATENT NO. : 4,805,125
DATED : February 14, 1989
INVENTOR(S) : James C. Beebe

It is certified that error appears in the above-identified patent and that said Letters Patent is hereby corrected as shown below:

Column 4, line 62, "laodwheel" should be --loadwheel--.

Column 6, line 37, "revolution" should be --revolutions--.

Column 7, line 5, "methematical" should be --mathematical--.

Column 18, line 17, "$V_{MAX} = R_{MAX}$" should be written as $$--V_{MAX} = R_{MAX} + [(P_{MAX}-S_{MAX})^2/8(2R_{MAX}-P_{MAX}-S_{MAX})]--.$$

Signed and Sealed this

Third Day of October, 1989

Attest:

DONALD J. QUIGG

Attesting Officer

Commissioner of Patents and Trademarks